United States Patent
Ochikubo

(10) Patent No.: US 8,879,985 B2
(45) Date of Patent: Nov. 4, 2014

(54) MEMORY ARBITRATOR FOR ELECTRONICS COMMUNICATIONS DEVICES

(75) Inventor: Craig Fukuo Ochikubo, Venice, CA (US)

(73) Assignee: Broadcom Corporation, Irvine, CA (US)

(*) Notice: Subject to any disclaimer, the term of this patent is extended or adjusted under 35 U.S.C. 154(b) by 212 days.

(21) Appl. No.: 13/170,885

(22) Filed: Jun. 28, 2011

(65) Prior Publication Data

US 2013/0005241 A1    Jan. 3, 2013

(51) Int. Cl.
*H04B 5/00* (2006.01)
*G06F 13/16* (2006.01)

(52) U.S. Cl.
CPC ................ *G06F 13/1605* (2013.01)
USPC ..... 455/41.1; 455/41.2; 455/41.3; 455/552.1; 455/47; 455/426.1; 455/562.1; 455/344; 340/5.61; 340/572.1; 340/540; 340/5.92; 340/10.1; 710/36; 710/37; 710/39; 710/40; 710/244

(58) Field of Classification Search
USPC .......... 455/41.1, 41.2, 41.3, 550.1, 74, 426.1, 455/562.1, 344; 340/5.61, 540, 572.1, 5.92, 340/10.1
See application file for complete search history.

(56) References Cited

U.S. PATENT DOCUMENTS

| | | | |
|---|---|---|---|
| 5,802,544 A * | 9/1998 | Combs et al. ................... 711/5 |
| 6,816,921 B2 * | 11/2004 | Jahnke et al. ................. 710/22 |
| 7,558,110 B2 | 7/2009 | Mizushima et al. |
| 7,762,470 B2 | 7/2010 | Finn et al. |
| 8,171,187 B2 * | 5/2012 | Rozen et al. ................... 710/40 |
| 2005/0191968 A1 * | 9/2005 | Tabayashi et al. ............ 455/74 |
| 2005/0222961 A1 * | 10/2005 | Staib et al. .................... 705/64 |
| 2006/0208066 A1 * | 9/2006 | Finn et al. .................... 235/380 |
| 2007/0253251 A1 * | 11/2007 | Mizushima et al. ..... 365/185.04 |
| 2007/0293155 A1 | 12/2007 | Liao et al. |
| 2008/0155258 A1 | 6/2008 | Obereiner et al. |
| 2009/0088077 A1 * | 4/2009 | Brown et al. ................. 455/41.2 |
| 2009/0291634 A1 | 11/2009 | Saarisalo |
| 2010/0011128 A1 * | 1/2010 | Paycher et al. .................. 710/1 |
| 2011/0007035 A1 * | 1/2011 | Shai ............................ 345/179 |
| 2012/0235787 A1 * | 9/2012 | Brient et al. ................. 340/5.61 |

FOREIGN PATENT DOCUMENTS

| | | |
|---|---|---|
| CN | 101064893 A | 10/2007 |
| CN | 101427197 A | 5/2009 |
| KR | 10-0980052 | 9/2012 |
| TW | 200849865 A | 12/2008 |
| WO | WO 2010/067222 A2 | 6/2010 |

OTHER PUBLICATIONS

English-language abstract for: Jee et al., KR 10-0980052.

(Continued)

*Primary Examiner* — Ganiyu A Hanidu
(74) *Attorney, Agent, or Firm* — Sterne, Kessler, Goldstein & Fox P.L.L.C.

(57) ABSTRACT

Embodiments of the invention include electronic communications devices having a memory in near field communication device, a memory arbitrator and a host processor. The near field communication (NFC) devices are configured to receive data and drive power from the communication signal. The memory arbitrator is connected to the NFC device and the memory. The memory arbitrator is also configured to access the memory in response to an access request from the NFC device. Additionally, the memory is configurable to be accessed by both the host processor and the NFC device according to embodiments of the present invention.

22 Claims, 6 Drawing Sheets

(56) References Cited

OTHER PUBLICATIONS

Extended Search Report from the European Patent Office for European Application No. EP 12 00 4704, dated Oct. 19, 2012, 6 pages.

Office Action directed at related Taiwanese Patent Application No. 101121730, mailed Apr. 22, 2014; 9 pages.

Chinese office action directed to related CN Application No. 201210217855.0, dated Aug. 7, 2014; 11 pages.

* cited by examiner

MEMORY ARBITRATOR FOR ELECTRONICS COMMUNICATIONS DEVICES

BACKGROUND OF THE INVENTION

1. Field of the Invention

The invention relates to a near field communications (NFC), and more specifically to effective power memory management within an electronic communication device containing an NFC device.

2. Related Art

Electronic communications devices (e.g., smart phones, PDAs, tablet computers, MP3 players, etc.), have become exceedingly common in a number of different areas. These devices can include a number of functional components that relate to the communications or processing. Historically, each of these components has had its own separate memory. It can, however, be inefficient for each of the functional components to have its own memory.

One recent trend in electronic communications devices is to integrate near field communication (NFC) devices in to them. By integrating NFC devices into communications devices, they can be made more useful in daily transactions. For example, instead of carrying around numerous credit cards, a user could provide a retailer credit information using a single communications device equipped with a NFC device. To do so, the communications device can be simply tapped to the retailer's credit card terminal and the information relayed from the NFC device in the communications device to the terminal to complete the transaction.

Another example where NFC devices are beginning to become popular are in ticket-writing systems, such as those used in bus and train terminals, concert venues, or any place requiring ticketed entry. Again, using a communications device equipped with NFC, a passenger or concert-goer is simply able to tap the communications device to a reader and ticket information is read by a terminal without the need for a paper ticket.

Generally, NFC requires that two NFC devices be present within a relatively small distance from one another so that their corresponding magnetic fields can exchange information. Typically, a first NFC device can transmit or generate a magnetic field modulated with the information, such as credit card information or ticket information. This magnetic field inductively couples onto a second NFC device that is proximate to the first NFC device. The second NFC device may respond to the first NFC device by modulating the magnetic field of the first NFC device or by generating its own modulated magnetic field and inductively coupling this modulated magnetic field to the first NFC device.

Operation of the first and second NFC devices in this manner can result in the depletion of the internal batteries of the respective communications device. When this occurs, an NFC device may have to derive its power from the magnetic field of another NFC device when the internal batteries of its respective communication device become too depleted. However, this magnetic field is typically unable to power other components of the NFC devices respective communications device. For instance, the power produced by the other NFC device is frequently incapable of powering a host processor, other communications components or a display of the communication device. Additionally, because a shared memory is typically accessed through a host processor, the NFC device is incapable of accessing a shared memory when the internal batteries of the communications device are depleted.

Thus, there exists a need in the art for a communications device that utilizes a shared memory and that is equipped with a NFC component that can operate and access the shared memory while the internal battery is depleted. Further aspects and advantages of the invention will become apparent from the detailed description that follows.

BRIEF DESCRIPTION OF THE DRAWINGS

Embodiments of the invention are described with reference to the accompanying drawings. In the drawings, like reference number indicate identical or functionally similar items. Additionally, the left-most digit(s) of a reference number indicates the drawing in which the reference number first appears.

DETAILED DESCRIPTION OF THE INVENTION

Figure 1:
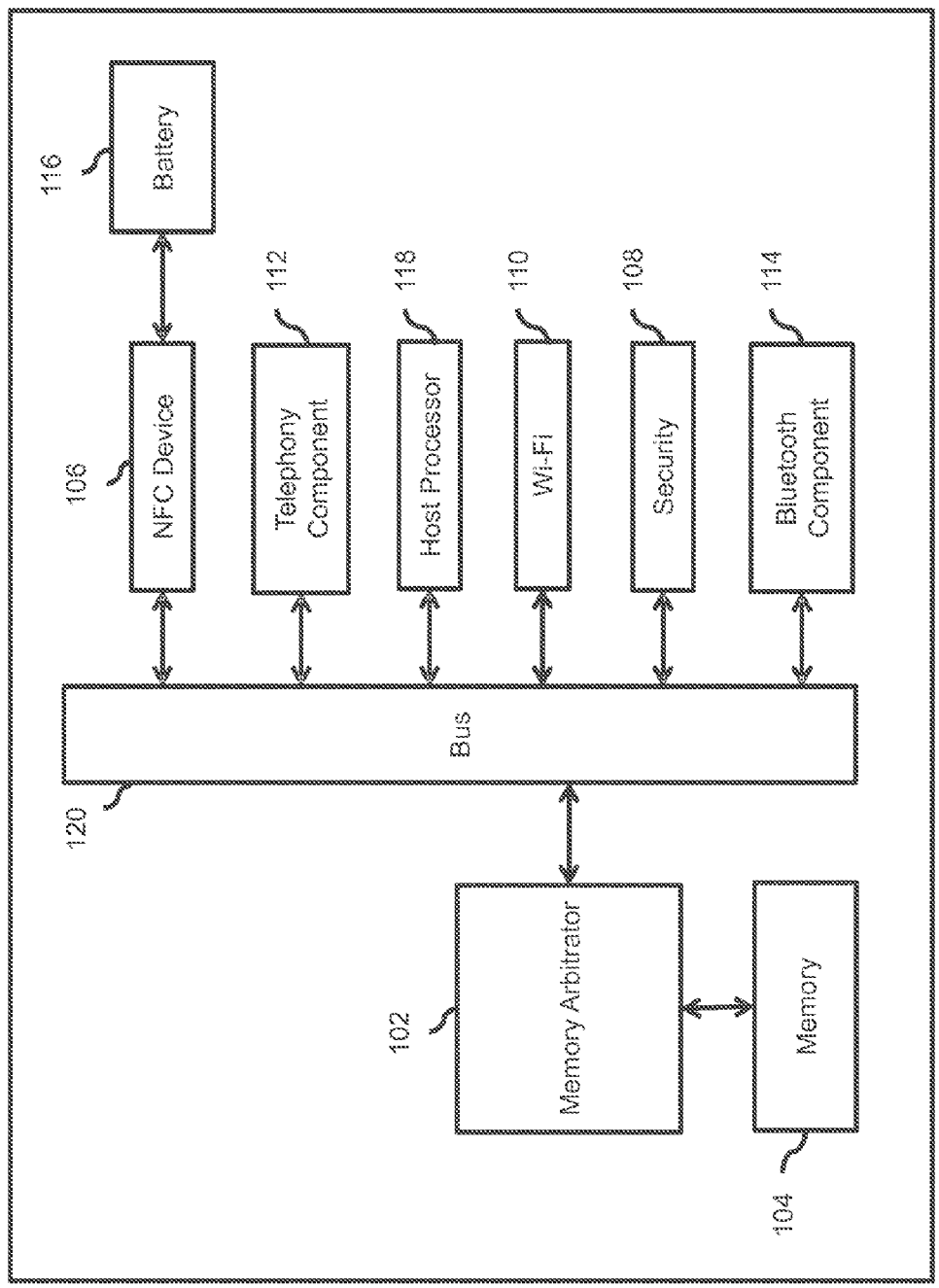
FIG. 1 illustrates a block diagram of a communications device with a memory arbitrator according to embodiments of the invention.

The following detailed description refers to accompanying drawings to illustrate exemplary embodiments consistent with the invention. References in the detailed description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art to effect such a feature, structure, or characteristic in connection with other exemplary embodiments whether or not explicitly described.

The exemplary embodiments described herein are provided for illustrative purposes, and are not limiting. Other exemplary embodiments are possible and modifications may be made to the exemplary embodiments within the spirit and scope of the invention. Therefore, the detailed description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a computer-readable medium which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and instructions may be described herein as performing certain actions. However, it should be appreciated that such descriptions are merely for convenience and that such actions in fact result from competing devices, processors, controllers or other devices executing the firmware, software, routines, instructions, etc.

The following detailed description of the exemplary embodiments will so fully reveal the general nature of the invention that others can, by applying knowledge of those skilled in the relevant arts readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in the relevant arts in light of the teachings herein.

Figure 6:
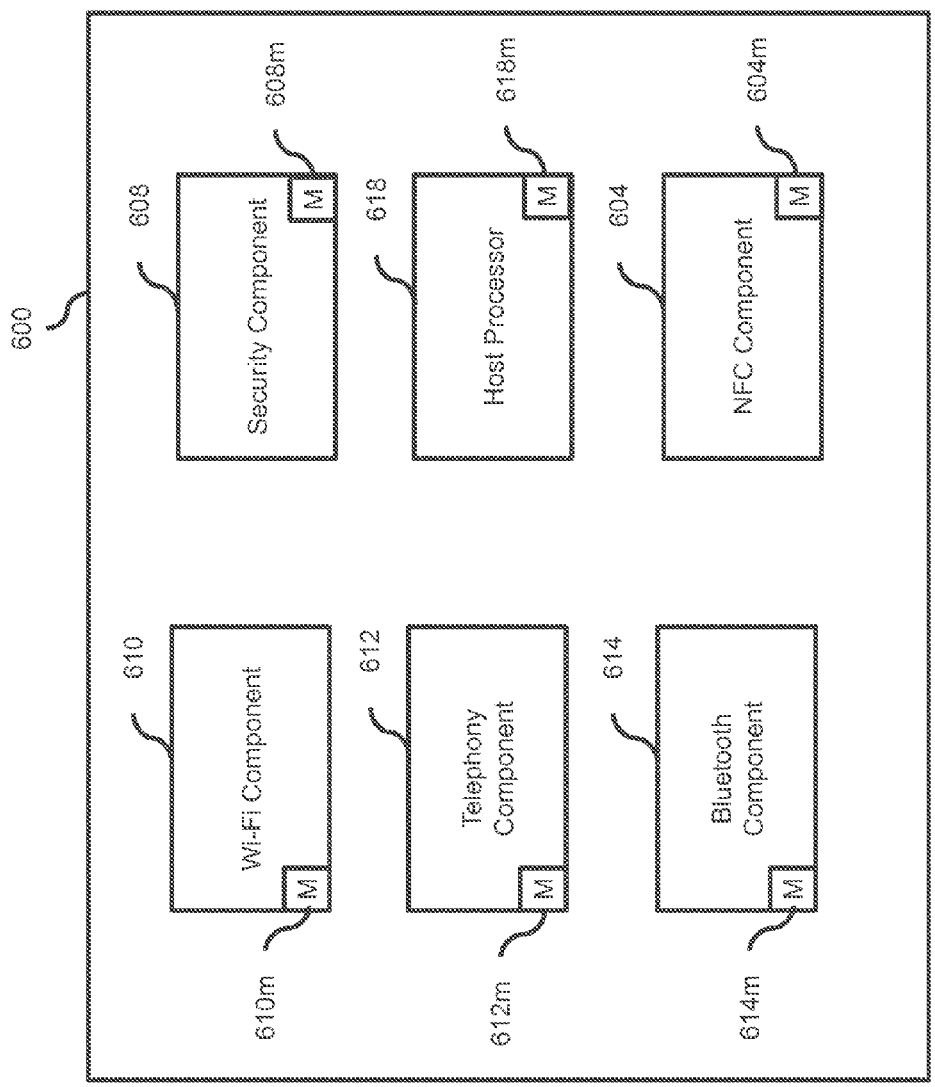
FIG. 6 illustrates a block diagram of a prior art electronic communications device.

As noted above, communications devices have historically contained a number of components that each has its own memory. FIG. 6 functionally illustrates a communications device with such a configuration.

As shown in FIG. 6 an electronic communications device 600 may include a plurality of functional components including, for instance, a WI-FI component 610, a telephony component 612, a Blue Tooth component 614, a security component 608, a host processor 618, and an NFC component 604. As can be seen in FIG. 6, each of the functional components (604, 608, 610, 612, 614, and 618) has associated with it a memory element (604m, 608m, 610m, 612m, 614m, and 618m). These memory elements are used to store data used by each of the individual functional components. For instance, the memory of the telephony component 612m may be used to store telephone numbers. Similarly, the memory of the WI-FI component 610m may be used to store remembered networks. Typically, however, the functional components are allowed no or very limited access to the memory of other functional components.

In contrast to the electronic communications device 600 shown in FIG. 6, FIG. 1 depicts an electronic communications device 100 with a shared memory 104 according to embodiments of the present invention. The electronic communications device 100 includes a memory arbitrator 102, a shared memory 104, an NFC device 106, a security component 108, a WI-FI component 110, a telephony component 112, a Blue Tooth component 114, a battery 116, a host processor 118, and a bus 120. According to embodiments of the present invention, the communications device 100 may represent a number of electronic communications devices including, but not limited to, mobile telephones, portable computing devices, other computing devices such as personal computers, laptops, desktop computers, computer peripherals such as printers, portable audio and/or video players, payment systems, ticket-writing systems such as parking ticket systems, a bus ticketing system, a train ticketing system, or an entrance ticketing system.

Although the description of the present invention is to be described in terms of NFC, those skilled in the relevant art(s) will recognize that the present invention may be applicable to other communications that use the near field and/or the far field without departing from the spirit and scope of the present invention. For example, although the present invention is to be described using NFC capable communication devices, those skilled in the relevant art(s) will recognize that functions of these NFC capable communication devices may be applicable to other communications devices that use the near field and/or the far field without departing from the spirit and scope of the present invention.

As is shown in FIG. 1, each of the functional components (106, 108, 110, 112, 114, and 118) is connected to memory arbitrator 102 via bus 120. A person of ordinary skill in the art would understand that the functional components could also be connected directly to memory arbitrator via direct connections, instead of being connected to it via common bus 120. The memory arbitrator 102 is connected to memory 104 and controls access to memory 104 by each of the functional components. When a functional component requires access shared memory 104, it requests shared memory access from memory arbitrator 102, which based on the availability of shared memory 104, allows or disallows read/write access to memory 104.

Figure 2:
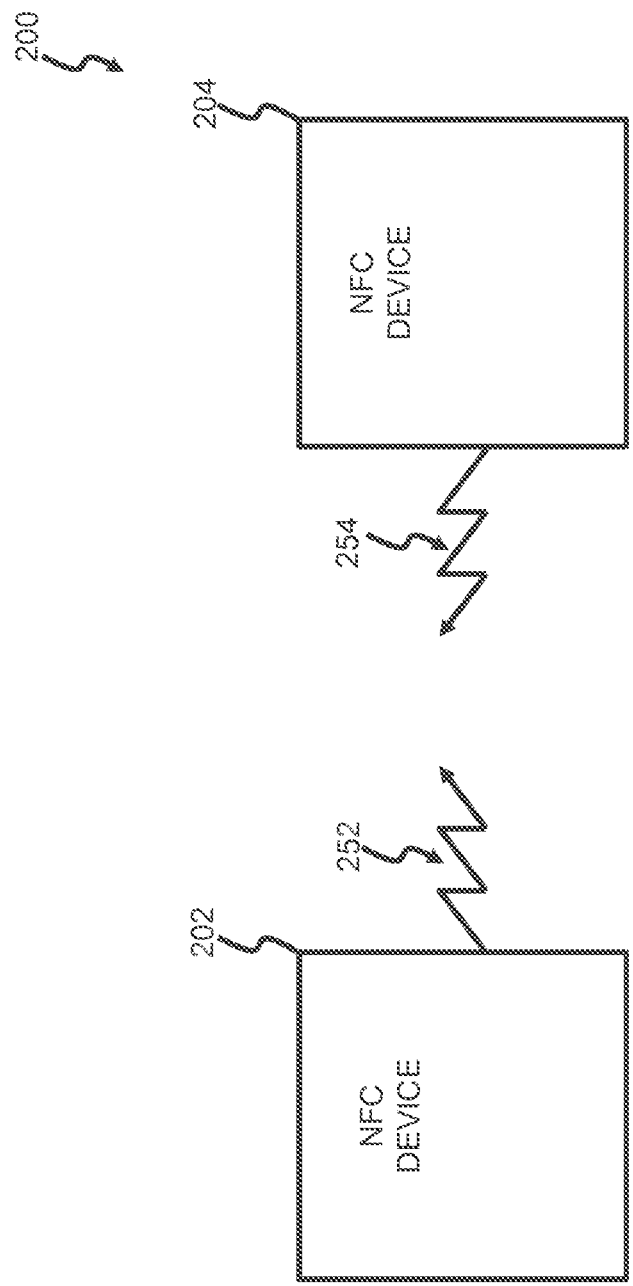
FIG. 2 illustrates a block diagram of communications between two NFC devices according to embodiments of the invention.

FIG. 2 is a block diagram of a NFC environment according to embodiments of the present invention. An NFC environment 200 provides wireless communication of information among a first NFC device 202 and a second NFC device 204 that are sufficiently proximate to each other. The information may include one or more commands to be executed by the first NFC device 102 and/or the second NFC device 104, data from one or more storage devices that is to be transferred to the first NFC device 102 and/or the second NFC device 104, or any combination thereof.

The first NFC device 202 and/or the second NFC device 204 interact with each other to exchange information such as data and/or one or more commands to be executed by the first NFC device 102 and/or the second NFC device 104. The NFC devices 202 and 204 may operate in a number of different modes. For instance, they may operate in a peer-to-peer (P2P) communications mode or a reader/writer (R/W) communications mode. In the P2P communications mode, the first NFC device 202 and the second NFC device 204 may be configured to operate according to active of communications mode and/or a passive communications mode. The first NFC device 202 modulates first information onto a first carrier wave, referred to a modulated data communication, and generates a first magnetic field by applying the modulated data communications 252. The first NFC device 202 ceases to generate the first magnetic field after transferring the first information to the second NFC device 204 in the active communications mode. Alternatively, in the passive communications mode, the first NFC device 202 continues to provide the first carrier wave without the first information, referred to as unmodulated data communication to continue to provide the first data communications 252 once the first information has been transferred to the second NFC device 204.

In the R/W communication mode, the first NFC device 202 is configured to operate in an initiator, or reader, mode of operation and the second NFC device 204 is configured to operate in a target, or tag, mode of operation. However, this example is not limiting, those skilled in the relevant art(s) will recognize that the first NFC device 202 may be configured to operate in the tag mode and the second NFC device 204 may be configured to operate as in the reader mode in accordance with the teachings herein without departing from the spirit and scope of the present invention. The first NFC device 202 modulates its corresponding information onto the first carrier wave and generates the first magnetic field by applying the modulated information communication to the first antenna to provide the first information communication 252. The first NFC device 202 continues to apply the first carrier wave without its corresponding information to continue to provide the first information communication 252 once the information has been transferred to the second NFC device 204. The first NFC device 202 is sufficiently proximate to the second NFC device 204 such that the first information communication 252 is inductively coupled onto a second antenna of the second NFC device 204.

Figure 3:
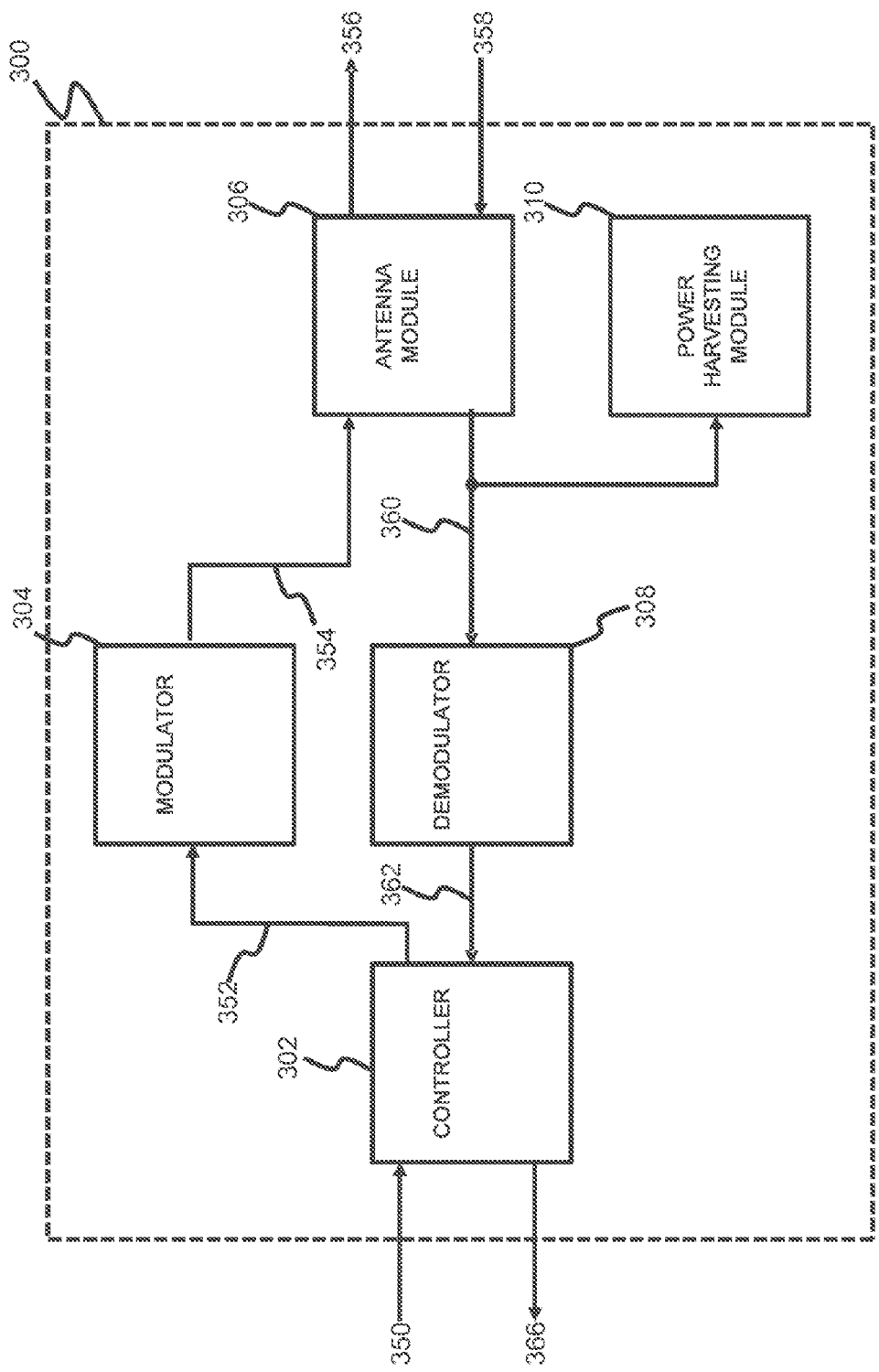
FIG. 3 illustrates a block diagram of an NFC device that is implemented as part communications device according to an exemplary embodiment of the invention.

FIG. 3 illustrates a block diagram of an NFC device that is implemented according to embodiments of the present invention. An NFC device may include a controller 302, a modulator 304, an antenna module 306, a demodulator 308 and a power harvesting device 310. The controller module 302 controls overall operation and/or configuration of NFC device 300. The controller module 302 receives information 350 from a data store such as memory 104. The controller module 302 may also receive information 350 from another functional component of the electronic communications device 100.

The information 350 may include one or more commands and/or data. The controller module 304 may issue and/or execute one or more commands to control the overall operation and/or configuration of the NFC device 300. For example, the controller module 302 may issue and/or execute commands to control operations of the NFC device 300 as well as other NFC communications devices such as a transmission of power, a transmission of data rate, a transmission frequency, modulation scheme, input and/or output scheme and/or any other suitable operation that would be apparent to those skilled in the relevant arts. According to some embodiments of the invention, the controller 302 may format information 350 into information frames 352 and provide them to modulator 304.

Modulator 304 modulates the information frames 352 into a carrier wave using any suitable analog or digital modulation technique to provide a modulated data communications transmission information 354 to an inductive coupling element such as a resonant circuit, to generate a magnetic field in order to provide a transmitted data communications 356. The antenna module 306 may also inductively couple a received communications signal 358 to an inductive coupling element in order to provide a recovered communication element 360 which the demodulator 308 can demodulate using any suitable analog or digital demodulation technique in order to provide information frames 362 to a controller 302.

In addition, the NFC device may include a power harvesting module 310. The power harvesting module may harvest power from the received communications signal 358. The harvested power may include sufficient power to adequately operate the controller module 302, the modulator module 304, the antenna modulator 306, the modulator module 308. Additionally, the power harvesting module may provide sufficient power to operate one or more of the other components of electrical communications device 100. For instance, the power harvester 310 may provide sufficient power to operate one of the other functional components (108, 110, 112, 114, and 118) the memory arbitrator 102 or the memory 104. According to some embodiments of the present invention, power harvester module may also provide sufficient power to charge battery 116.

Referring back to FIG. 1, when any of the functional components (106, 108, 110, 112, 114, and 118) wish to access memory, they do so by sending a memory access request message to memory arbitrator 102, which will then provide memory access based on the availability of memory 104. However, when multiple functional components wish to access the memory 104 at the same time, memory arbitrator must handle the conflicting requests. According to some embodiments of the present invention, memory arbitrator resolves conflicts in memory access requests according to the process outlined in FIG. 4

Figure 4:
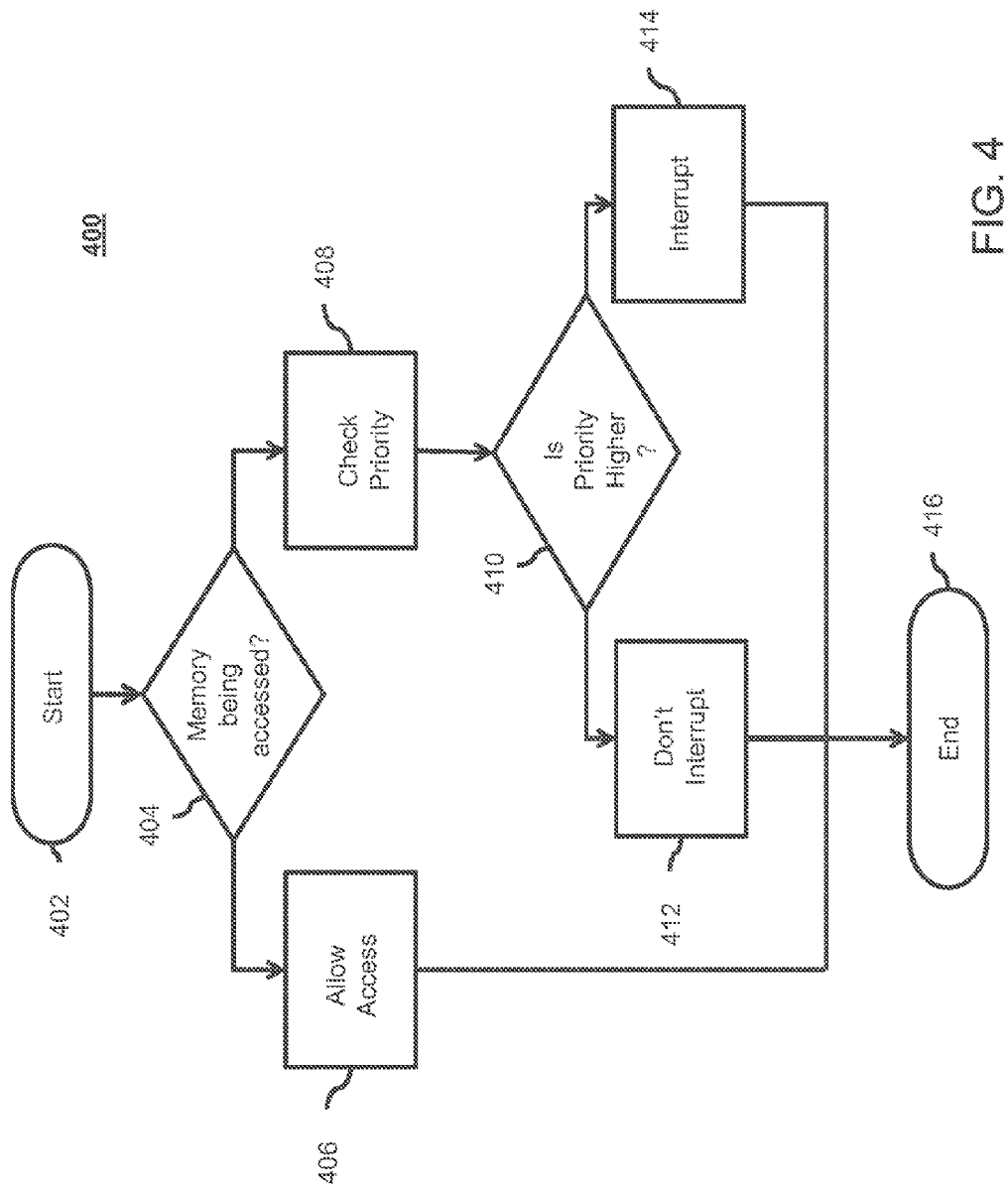
FIG. 4 is a flow chart depicting how memory conflicts are handled according to embodiments of the present invention.

FIG. 4 depicts a process used by a memory arbitrator 102 for resolving conflicts in memory access requests amongst the several functional components of an electronics communications device 100. Each time a memory request is made, the memory arbitrator 102 performs a check to see if a memory is currently being accessed at step 404. If the memory arbitrator determines that the memory is not currently being accessed at step 404, it allows the allows access to the memory by the requesting functional component at step 406. Alternatively, if the memory arbitrator determines that the memory is currently being accessed at step 404, it checks the priority of the requesting functional component at step 408. According to some embodiments of the present invention, each of the functional components may be given a priority. For instance, a telephony component 112 may have a higher priority than the WI-FI component 110. According to some embodiments of the present invention, the NFC component is given the highest priority. After checking the priority of the requesting functional component at step 408, the memory arbitrator 102 determines whether the requesting functional component has a higher priority than the functional component currently accessing the memory at step 410. If at step 410 the memory arbitrator 102 determines that the functional component that is currently accessing the memory has a higher priority than the one that wishes to access the memory, then it does not interrupt and follows according to step 412. However, if the requesting functional component has a higher priority than the functional component currently accessing the memory, then the memory arbitrator interrupts the memory access and allows the requesting functional component to access the memory. Additionally, according to various embodiments, memory access arbitrator 102 is configured to facilitate a memory access while the host processor 118 is inactive due to, for instance, the internal battery being depleted.

Figure 5:
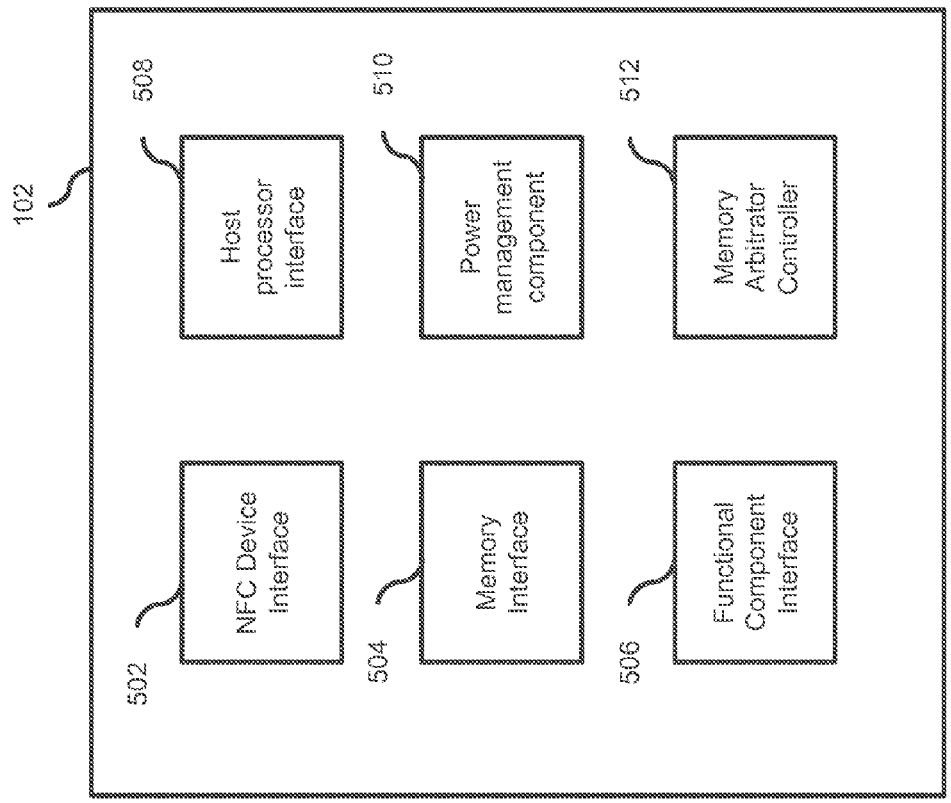
FIG. 5 illustrates a block diagram of a memory arbitrator according to embodiments of the present invention.

FIG. 5 depicts a block diagram of the memory arbitrator 102 according to embodiments of the present invention. Memory arbitrator 102 may include a plurality of components including an NFC device interface 502, memory interface 504, functional component interface 506, host processor interface 508, power management component 510, a memory arbitrator controller 512, and a functional component interface 506. According to embodiments of the invention, the memory arbitrator 102 may include more than one functional component interface 506.

According to embodiments of the present invention, the NFC device interface 502 is responsible for managing communications between the memory arbitrator 102 and the NFC devices. Additional the interface may provide power to the memory arbitrator 102 from power harvester of the NFC device in order to power the memory arbitrator when the internal batteries of the electronic communication device 116 are depleted. The memory interface 504 of the memory arbitrator communicates with the shared memory 104 in order to determine availability and facilitate read/write access of the various requesting components. The one or more functional component interfaces of the memory arbitrator 102 facilitate communication between the memory arbitrator 102 and the functional components. Similarly, the host processor interface facilitates communication between the memory arbitrator 102 and the host processor 118. The memory arbitrator 102 may also contain a power management component 510, which facilitates power management within the electronics communications device. The power management component 510 may be responsible for, amongst other things, activating or deactivating various functional components in response to available power levels. Memory arbitrator controller 512 is configured to control the operation of the memory arbitrator. For instance, the memory arbitrator controller 512 can determine when to allow a functional component to access the memory 104. According to some embodiments, the memory arbitrator controller is configured to apply logic to determine which of several conflicting memory access requests is to be granted. Some embodiments employ the process outlined in FIG. 4 and discussed above to determine which of several conflicting memory access requests is to be granted.

Conclusion

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the invention should not be limited by any of the above-described exemplary embodiments, but should be defined only in accordance with the following claims and their equivalents.

What is claimed is:

1. An electronic device, comprising:
   a memory;
   a near field communication (NFC) device configured to receive data, power, and an NFC memory access request from a communication signal;
   a host processor;
   a functional component configured to provide a functional component memory access request; and
   a memory arbitrator configured to:
   access the memory in response to the NFC memory access request from the NFC device when the host processor is inactive,
   resolve a conflict between the NFC memory access request and the functional component access request based on priority, and
   grant, without requesting access from the host processor, access to the memory to the functional component when the functional component has a higher priority than the NFC device.

2. The electronic device according to claim 1, wherein the memory arbitrator is configured to be powered by power derived by the NFC device.

3. The electronic device according to claim 1, further comprising a battery.

4. The electronic device according to claim 3, wherein the battery is configured to be recharged by power derived by the NFC device.

5. The electronic device according to claim 1, wherein the memory arbitrator is configured to perform power management functions.

6. The electronic device according to claim 1, wherein the NFC device is configured to transmit data to another device.

7. The electronic device according to claim 1, wherein the functional component is configured to be powered by power derived by the NFC device.

8. The electronic device according to claim 1, wherein the memory arbitrator is configured to activate the functional component.

9. The electronic device according to claim 1, wherein the memory arbitrator is configured to process access requests from the the functional component and from the NFC device according to a priority assigned to the functional component and the NFC device.

10. The electronic device according to claim 1, wherein the functional component is one of: a telephony component, a wireless internet component, a Bluetooth component, and a security component.

11. The electronic device according to claim 1, wherein the memory arbitrator is configured to grant memory access to the functional component while the host processor is inactive.

12. A memory arbitrator comprising:
    a near field communication (NFC) device interface configured to receive data, power, and an NFC memory access request from an NFC device;
    a memory interface configured to access a memory;
    a functional component interface configured to communicate with one or more functional components and receive a functional component memory access request; and
    a memory arbitrator controller configured to:
    facilitate access to the memory in response to the NFC access request from the NFC device when an associated host processor is inactive,
    resolve a conflict between the NFC memory access request and the functional component memory access request based on a priority associated with each of the NFC device and the one or more functional components, and
    grant, without requesting access from the host processor, access to the memory to the one or more functional components when the one or more functional components have a higher priority than the NFC device.

13. The memory arbitrator according to claim 12, further comprising a power management component configured to perform power management functions.

14. The memory arbitrator according to claim 13, wherein the power management component is configured to receive power from the NFC device interface.

15. The memory arbitrator according to claim 12, wherein the memory interface is configured to facilitate the memory access by the one or more functional components.

16. The memory arbitrator according to claim 12, wherein the functional component interface is configured to activate the one or more functional components.

17. The memory arbitrator according to claim 16, wherein the functional component interface is configured to interface with at least one of: a telephony component, a wireless internet component, a Bluetooth component, and a security component.

18. The memory arbitrator according to claim 12, further comprising a host processor interface connected to the associated host processor.

19. The memory arbitrator according to claim 12, wherein the functional component interface is configured to receive the functional component memory access request from the one or more functional components.

20. The memory arbitrator according to claim 19, wherein the memory arbitrator controller is further configured to grant the NFC memory access request and the functional component memory access request based on a priority associated with the NFC device and the one or more functional components.

21. The electronic device according to claim 1, wherein the memory arbitrator is further configured to resolve the conflict by determining that the NFC device has a higher priority than the functional component and a memory access of the functional component.

22. The electronic device according to claim 1, wherein the memory arbitrator is further configured to resolve a second conflict between the functional component access request and an additional functional component access request.

* * * * *